(12) United States Patent
Nylander-Hill

(10) Patent No.: US 9,355,675 B2
(45) Date of Patent: May 31, 2016

(54) VARIABLE SCOPING CAPABILITY FOR PHYSICAL TAPE LAYOUT DIAGNOSTIC STRUCTURE OF TAPE STORAGE DEVICE

(71) Applicant: International Business Machines Corporation, Armonk, NY (US)

(72) Inventor: Pamela R. Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/331,188

(22) Filed: Jul. 14, 2014

(65) Prior Publication Data

US 2016/0012844 A1    Jan. 14, 2016

(51) Int. Cl.
| | | |
|---|---|---|
| G11B 5/008 | (2006.01) | |
| G11B 19/04 | (2006.01) | |
| G11B 20/12 | (2006.01) | |
| G11B 20/18 | (2006.01) | |
| G11B 20/10 | (2006.01) | |

(52) U.S. Cl.
CPC ......... *G11B 19/048* (2013.01); *G11B 5/00813* (2013.01); *G11B 20/1205* (2013.01); *G11B 20/10305* (2013.01); *G11B 20/18* (2013.01); *G11B 2020/1265* (2013.01); *G11B 2020/1292* (2013.01)

(58) Field of Classification Search
None
See application file for complete search history.

(56) References Cited

U.S. PATENT DOCUMENTS

| | | |
|---|---|---|
| 4,048,481 A | 9/1977 | Bailey, Jr. et al. |
| 5,233,477 A | 8/1993 | Scheffler |
| 5,327,305 A | 7/1994 | Thomas |
| 5,812,883 A | 9/1998 | Rao |
| 5,880,902 A | 3/1999 | Yu et al. |
| 6,130,794 A | 10/2000 | Christensen |
| 6,268,975 B1 | 7/2001 | Bickers |
| 6,498,693 B1 | 12/2002 | Au et al. |
| 6,587,300 B1 | 7/2003 | Dobbek |
| 6,798,602 B2 | 9/2004 | Greco |
| 7,277,246 B2 | 10/2007 | Barbian et al. |
| 7,280,293 B2 | 10/2007 | Nylander-Hill et al. |
| 8,717,698 B2 | 5/2014 | Nylander-Hill et al. |
| 8,908,485 B2 | 12/2014 | Butt et al. |
| 8,908,486 B2 | 12/2014 | Butt et al. |
| 9,263,092 B2 | 2/2016 | Butt et al. |
| 2005/0018338 A1 | 1/2005 | Su et al. |
| 2006/0174353 A1 | 8/2006 | Ryal |
| 2006/0176598 A1 | 8/2006 | Evans et al. |
| 2006/0190205 A1 | 8/2006 | Klein et al. |
| 2007/0014042 A1 | 1/2007 | Nylander-Hill et al. |
| 2007/0076552 A1 | 4/2007 | Chao et al. |
| 2007/0115579 A1 | 5/2007 | Ngo |
| 2007/0242584 A1 | 10/2007 | Chan |
| 2007/0253088 A1 | 11/2007 | Clarke et al. |

(Continued)

OTHER PUBLICATIONS

List of IBM Patents or Patent Applications Treated as Related.
(Continued)

*Primary Examiner* — Brian Butcher
(74) *Attorney, Agent, or Firm* — Zilka-Kotab, PC

(57) ABSTRACT

According to one embodiment, a method includes collecting data relating to operation of a tape drive, storing the collected data in a tape map, and storing a subset of the collected data in a slice region upon at least one of experiencing a first trigger condition and reaching a predefined location on a tape. Other systems, methods, and computer program products are described in additional embodiments.

18 Claims, 7 Drawing Sheets

(56) References Cited

U.S. PATENT DOCUMENTS

| | | |
|---|---|---|
| 2009/0174965 A1 | 7/2009 | Greco et al. |
| 2009/0235011 A1 | 9/2009 | Leopold et al. |
| 2011/0307865 A1 | 12/2011 | Grieves et al. |
| 2012/0307615 A1 | 12/2012 | Butt et al. |
| 2013/0142023 A1 | 6/2013 | Butt et al. |
| 2015/0078148 A1 | 3/2015 | Butt et al. |

OTHER PUBLICATIONS

Non-Final Office Action from U.S. Appl. No. 14/548,208, dated Mar. 17, 2015.
Notice of Allowance from U.S. Appl. No. 13/149,761, dated Aug. 1, 2014.
Notice of Allowance from U.S. Appl. No. 13/757,371, dated Aug. 4, 2014.
Butt et al., U.S. Appl. No. 14/548,208, filed Nov. 19, 2014.
U.S. Appl. No. 13/149,761, filed May 31, 2011.
U.S. Appl. No. 13/757,371, filed Feb. 1, 2013.
Non-Final Office Action from U.S. Appl. No. 13/149,761 dated Jun. 7, 2013.
Non-Final Office Action from U.S. Appl. No. 13/149,761 dated Jan. 15, 2014.
Non-Final Office Action from U.S. Appl. No. 13/757,371 dated Jun. 26, 2013.
Non-Final Office Action from U.S. Appl. No. 13/757,371 dated Jan. 16, 2014.
Final Office Action from U.S. Appl. No. 14/548,208, dated Aug. 7, 2015.
Notice of Allowance from U.S. Appl. No. 14/548,208, dated Oct. 21, 2015.

VARIABLE SCOPING CAPABILITY FOR PHYSICAL TAPE LAYOUT DIAGNOSTIC STRUCTURE OF TAPE STORAGE DEVICE

BACKGROUND

The present invention relates to data storage systems, and more specifically, this invention relates to implementing variable scoping capability for physical tape layout diagnostic structures of tape storage devices.

Many tape storage devices, such as an IBM® 3592/TS1150 storage tape drive, contain an internal data log for mapping measurable characteristics of the tape drive while in operation. This data log is often stored in buffer memory for retrieval and analysis. In some systems, the data log (sometimes referred to as a tape map) stores errors, significant events, operating ranges, and performance statistics for the core functional areas of the tape drive for the duration of a cartridge mount. This complex data structure is a component of a microcode dump file which is used for failure analysis by both engineering and general product support. The tape map content varies according to many factors, such as manufacturer, model, product generation, etc., but is basically a representation of a fixed set of metrics applied to the interaction between media, recording head, servo control, dataflow electronics, and microcode for a given cartridge mount.

This tape map provides a physical view of a mounted cartridge. As the drive is processing data on a given cartridge, the errors, significant events, operating ranges, and performance statistics are stored in the tape map according to their physical location within the cartridge. Physical location is defined by a physical wrap number and a fixed number of equal length sections (or regions) along that wrap extending from beginning of tape (BOT) to end of tape (EOT). Since the region count is fixed for a given tape drive, cartridges of different lengths will have different region lengths, so each cartridge type has a different resolution of data. In general, this resolution does not prevent effective evaluation of tape map data.

BRIEF SUMMARY

A method, according to one embodiment, includes collecting data relating to operation of a tape drive, storing the collected data in a tape map, and storing a subset of the collected data in a slice region upon at least one of experiencing a first trigger condition and reaching a predefined location on a tape.

A system, according to another embodiment, includes a processor and logic integrated with and/or executable by the processor, the logic being configured to: collect data relating to operation of a tape drive, store the collected data in a tape map, and store a subset of the collected data in a slice region upon at least one of experiencing a first trigger condition and reaching a predefined location on a tape.

A computer program product, according to yet another embodiment, includes a computer readable storage medium having program instructions embodied therewith, the program instructions readable and/or executable by a controller to cause the controller to: collect, by the controller, data relating to operation of a tape drive, store, by the controller, the collected data in a tape map, and store, by the controller, a subset of the collected data in a slice region upon at least one of experiencing a first trigger condition and reaching a predefined location on a tape.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing an additional slice of a tape map to provide a more localized view of the errors of a portion of tape, e.g., for failure analysis.

According to one general embodiment, a method includes collecting data relating to operation of a tape drive, storing the collected data in a tape map, and storing a subset of the collected data in a slice region upon at least one of experiencing a first trigger condition and reaching a predefined location on a tape.

According to another general embodiment, a system, according to another embodiment, includes a processor and logic integrated with and/or executable by the processor, the logic being configured to: collect data relating to operation of a tape drive, store the collected data in a tape map, and store a subset of the collected data in a slice region upon at least one of experiencing a first trigger condition and reaching a predefined location on a tape.

According to yet another general embodiment, a computer program product, according to yet another embodiment, includes a computer readable storage medium having program instructions embodied therewith, the program instructions readable and/or executable by a device to cause the device to: collect data relating to operation of a tape drive, store the collected data in a tape map, and store a subset of the collected data in a slice region upon at least one of experiencing a first trigger condition and reaching a predefined location on a tape.

Figure 1:
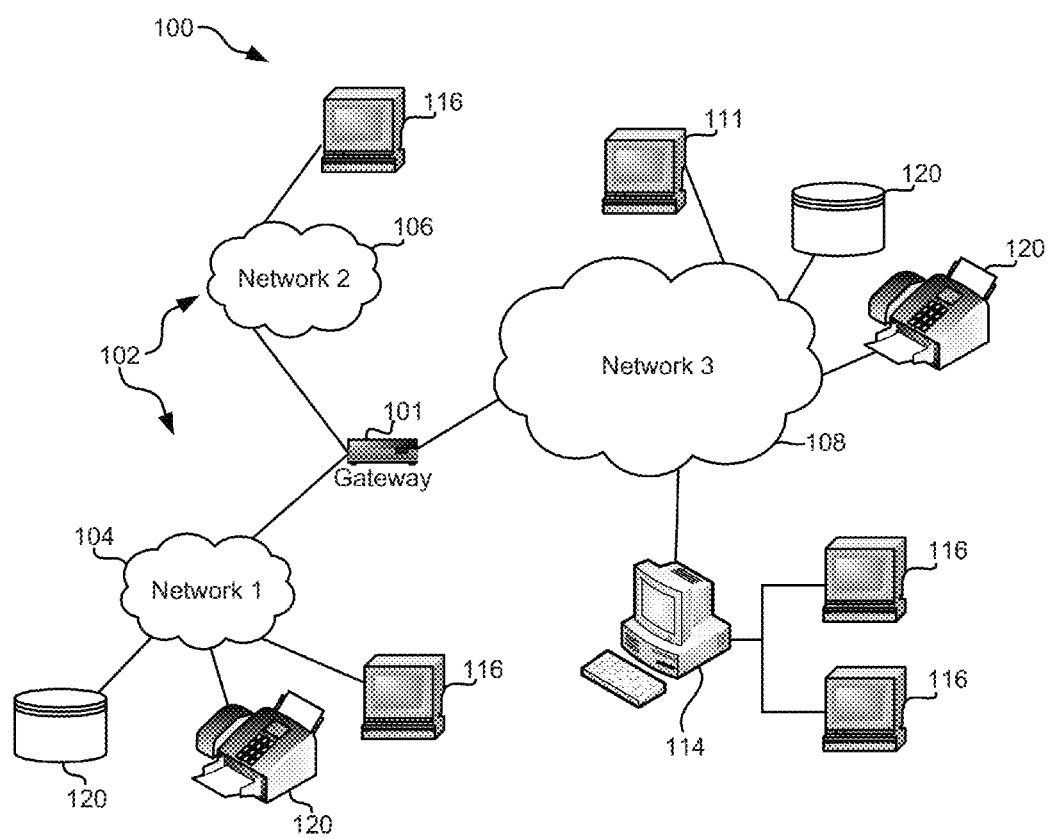
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
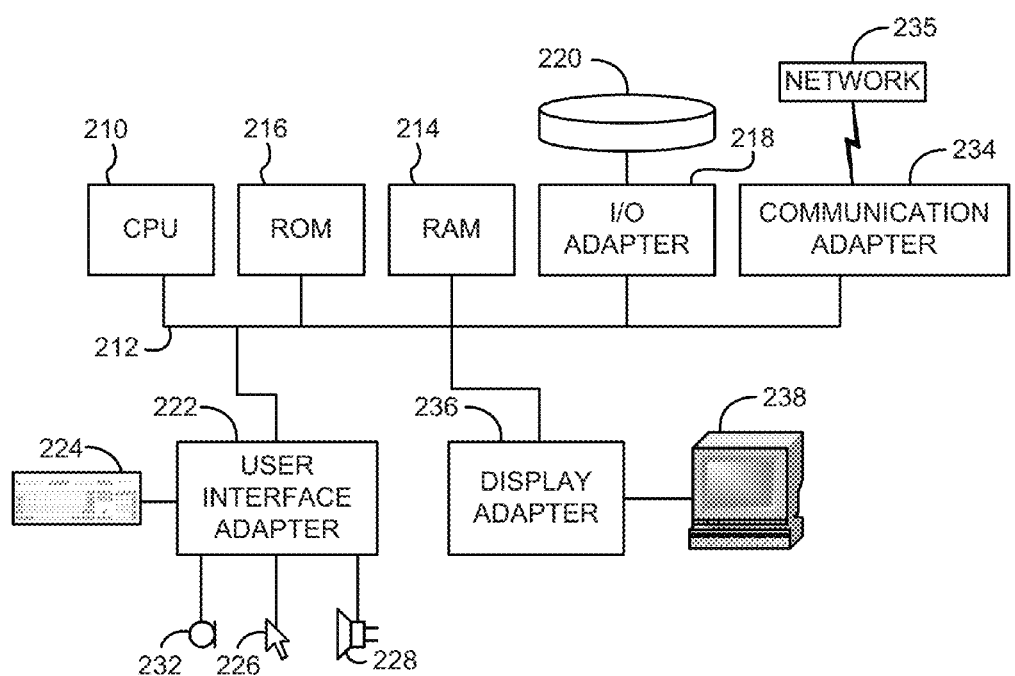
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
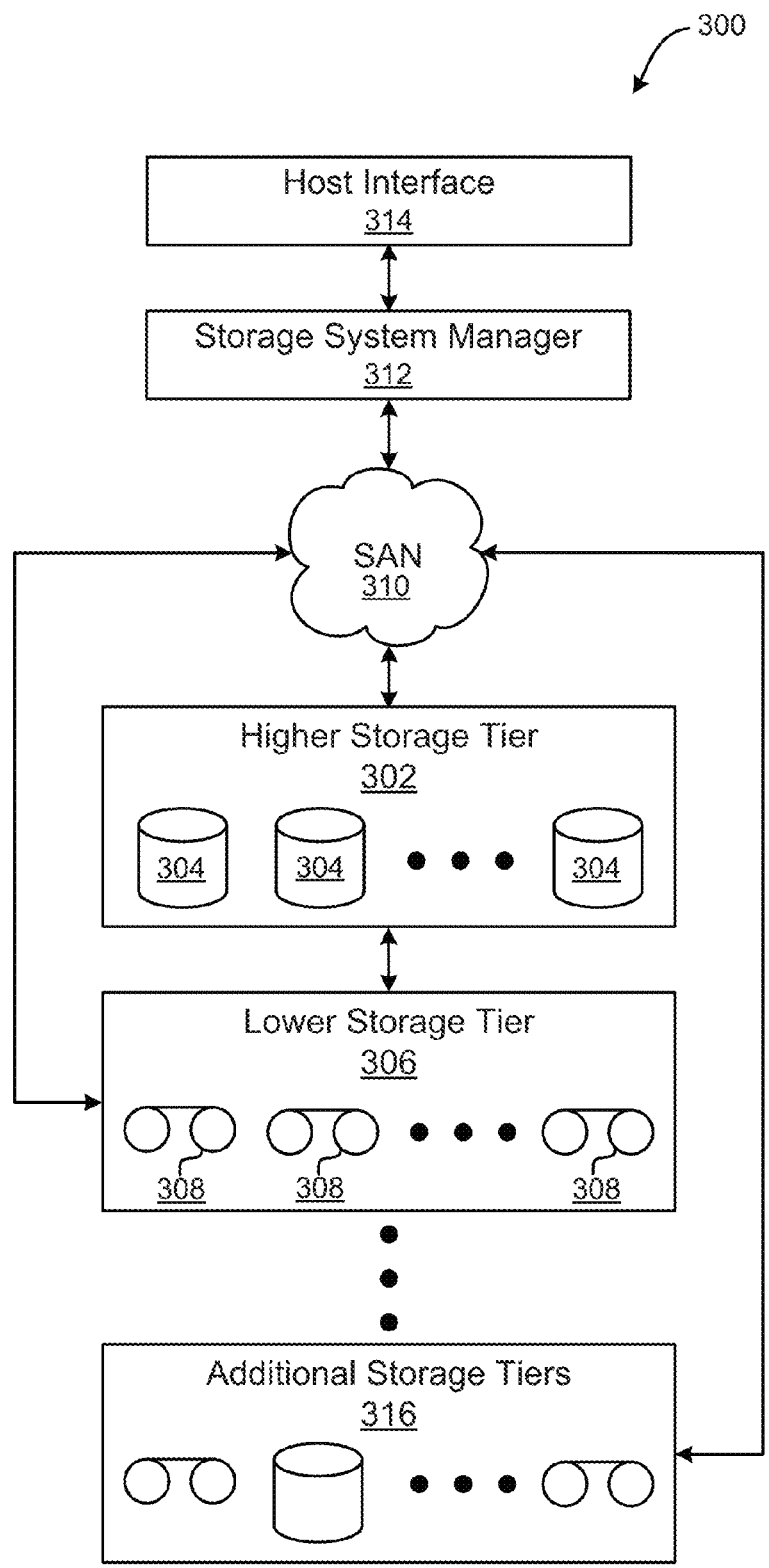
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments as would be appreciated by one skilled in the art upon reading the present description.

Various data storage systems may include storage tape drives. Furthermore, storage tape drives may include a tape map having the capability of logging errors, operating ranges, performance characteristics, etc., for the duration of a cartridge mount, and stored in memory, e.g., for future use. This tape map may be a complex data structure having the ability to serve multiple functions. In some approaches, the tape map may be a component of a microcode dump file which can be used for failure analysis by different product support entities.

As previously mentioned, a tape map provides a representation of physical characteristics of the mounted cartridge. As the drive is processing data on this cartridge, the tape map is simultaneously populated with errors, events, status, and optimization activity, e.g., corresponding to physical locations of the mounted tape cartridge.

Using servo indexing control to position the recording head, data may be processed in a serpentine fashion horizontally along wraps which span the length of tape. Corresponding to the serpentine fashion, the wraps are processed in a forward direction towards end of tape and in a backward direction towards beginning of tape. According to one approach, the tape map uses a physical location on tape to log statistical data. Moreover, a physical location may be defined by a physical wrap number and a fixed number of equal length sections (or regions) along that wrap extending from a BOT to an EOT. The region count per wrap may be fixed for a given tape drive, but supported cartridge types may have different lengths. Therefore, each cartridge type has a different resolution of data given a fixed number of logging regions. In general, this resolution does not prevent effective evaluation of tape map data for failure analysis.

However, some anomalies affecting servo or channel performance occur in a localized area of tape which is smaller than the region size. As a result, in conventional products, valuable error statistics stored in the tape map corresponding to these localized performances are effectively diminished given a larger number of non-error statistics in the same region. In other words, the resolution of conventional tape maps is not high enough to adequately represent valuable error statistics which occur in a location significantly smaller than the default logging region.

In sharp contrast to the conventional shortcomings described above, various embodiments described and/or suggested herein include slice regions which better represent regions of interest. A slice region may be formed by resizing a default region size into a smaller size, e.g., in order to better scope a defect using the tape map. Moreover, each generation of tape drive supports increasingly longer cartridge lengths and often a larger, more specialized set of error metrics. Therefore adding scoping ability improves failure analysis by adding a level of logging flexibility. Additionally, the added scoping ability prevents the size of tape maps from growing unnecessarily large by adding more default regions to compensate for longer length tape in order to increase the desired level of resolution, as will be described in detail below.

Tape map header changes may be used to identify which fields are being overlaid, according to one embodiment. In general, per-channel logging fields, servo fields, and histograms are eligible to be overlaid, but other fields may be used according to what actual fields are available in the tape map, as would be understood by one of skill in the art upon reading the present descriptions. When one or more overlays have been specified, these data structures will no longer log nominal (default) content, but instead will log the information as identified in the tape map header. Based on user specification, not only the content but the collection timing may be dynamically modified. Although per-channel, servo, and histograms data assumes a certain content, the user can pass whatever data is pertinent to the problem under study. For example, the owner may specify modifications to 32 data channel logging but the data passed may be unrelated to data channel performance.

In typical usage, overlays are transitory in nature and are intended to be flexible. However, they are not so limited. Both data content and overlay combinations are up to user discretion. If a given modification becomes a standard practice, then it may become a standard invocation with a permanent microcode implementation, in one embodiment. In that case, users may request it from the set of pre-defined overlay options, and therefore complete overlay specification would no longer be required.

Some embodiments include two primary interfaces for support. According to one approach: at least one external host command interface, e.g., which may select a pre-defined overlay or define a unique overlay, and at least one internal tape map interface, e.g., which may collect overlay data from the functional area of code identified as the overlay owner. Other interfaces may be used according to the design parameters, system configuration, etc., as would be appreciated by one of skill in the art upon reading the present descriptions. When application of a pre-defined overlay is desired, a limited command invocation at the host interface may be used. When engineering overlays are desired, the host interface command may require a more complete definition of the target overlay, owning subsystem, and/or overlay logging rules. Some engineering overlays may require additional microcode support to be implemented prior to successful host invocation. This implementation may include defining a new tape map/owner interface, and the owner subsystem may include microcode changes to provide overlay data at the appropriate collection windows in order for the scheme to operate properly. As such, engineering overlays tend to be vendor-specific and not targeted to field support, but may be used in the field when available to do so.

Tape map data collection behavior can be summarized and/or controlled by two host commands, e.g., one read command for identifying the allowed options and configurations of a given drive type and one write command to alter one or more of these or perform overlay/mode resets, according to one approach. Moreover, default control may be asserted at power-on and/or when new microcode is downloaded. The host Tape Map Write Control command may be issued when the drive is unloaded or when a cartridge has been loaded in order to modify basic tape map collection behavior and/or specify a range of overlay options that modify field collection. The overlays are honored unless restricted by special features or other configuration limitations. These limitations and options may be identified, detected, or otherwise known by issuing a host Tape Map Read Control command. Control changes persist until another control change is made or reset issued. According to preferred embodiments, control changes stay in effect for the current mount and all subsequent mounts, e.g., until another control change or reset is made. —Tape map data may be output as raw numerical data which can be parsed by keyword. This output format is suitable for bulk statistical analysis using external software packages such as MATLAB. In addition, a visual representation of the error and event metrics extracted from the tape map can generate a number of reports more appropriate for visual analysis. These reports can be generated using outside processing (or formatting). Using that visual output, the default metrics can be analyzed by category or in combination with other metric categories. This is a method of failure analysis, but also a way to improve overall read/write quality by observing patterns and error signatures for possible optimization. Any number of overlays can be requested to any set of metrics in order to analyze new metrics in relation to default metrics.

Two new host commands may be specified to provide a new interface to tape map control: Tape Map Read Control and Tape Map Write Control. These new commands are intended to replace prior methods of host interface control to the tape map, but in some embodiments, they made be made in addition to existing tape map control. The new commands are self-defining in that there is flexibility to: modify basic tape map control (unrelated to overlay control); summarize a range of overlay options and settings available for the basic tape map logging mode selected, the product generation, and the recording format; and enable the ability to accept one or more specified overlays and apply them in combination; reset all or a subset of active overlays and configurations. At the time of a control change or reset the tape map data structure may be cleared to zero.

Overlay control is self-defining, in one embodiment, since available options change according to manufacturer, product generation, recording format, and with changes to basic tape map control. The Read Tape Map Control command allows users to browse allowed overlay options and settings for their current configuration. This feedback, according to one embodiment, includes information such as max counter size so that users know how to log or scale data for each option in the current configuration. It is a flexible interface that allows new options and settings to be made available without change to a default host command structure.

A histogram, in one implementation, is a numeric representation that organizes data into a group of any number of specified ranges, such as two ranges, three ranges, four ranges, five ranges, etc. The ranges are in increasing sequence for integers n, m, and p, as shown for an example of four ranges: Histogram Group 1: Range=0 to n; Histogram Group 2: Range=n+1 to n+m; Histogram Group 3: Range=n+m+1 to n+p; and Histogram Group 4: Range=greater then n+p.

There are a variable number of histograms for each default tape map control mode and for each manufacturer's tape drive, generation, and recording format. Typically, these histograms track dataflow encode/decode parameters, but are not so limited. The user has the option of allowing the tape map microcode to select the overlay histogram or the user may opt to specify one or more specific histograms to overlay, in some approaches. The user also has the option to pass pre-histogram'd data on the internal interface or to provide numeric ranges that allow collection data to be histogram'd by the tape map interface collection code, in more approaches. The collection window may also be controlled.

A recording head is the physical interface between a recording apparatus and a moving recording medium. The magnetic head has a set of elements and optimizing electronics that records encoded data using a set of parallel data channels. Depending on the format, the number of parallel channels varies (e.g., 8, 16, 32).

There are a variable number of per-channel sets for each default tape map control mode and for each manufacturer's tape drive, generation, and recording format. The tape map typically logs performance on each channel using dataflow encode/decode metrics. The user has the option of allowing the tape map microcode to select the per-channel set to overlay or the option to select one or more specific per-channel sets for overlay, according to some approaches. The user may also control the collection window.

A more limited per-channel logging overlay is also available, in some approaches. Since an overlay implies data substitution (loss of information), it may be of value to initially narrow overlay logging to a simple threshold indication, in one embodiment. Indicators are implemented as a bit-mask (1-bit per data channel). At the specified timing, only indicators will be collected from the owner subsystem. These indicators are stored separately in the tape map and do not overlay default per-channel logging fields Based on analysis of these indicators in the tape map, users may opt to enable/disable other per-channel overlays. According to an exemplary embodiment, which is in no way intended to limit the invention, a tape map may log 6 servo fields or metrics which can be overlaid all or in part with different servo data. However, in other approaches, the servo fields or metrics may be obsoleted, e.g., logging of default servo data may be suppressed.

Overlays can be done singly or in combination. This allows flexibility to scope different fields in relationship to each other. For example, in one embodiment, all of these overlays can be active simultaneously: Histogram overlay; servo overlay; Per-Channel Overlay: and Per-Channel Overlay Indicators.

Using a Read Tape Map Control Command, a user can understand what target fields are available for overlay. Moreover, a user can use a Write Tape Map Control Command to specifically indicate which such field should be overlaid, in some approaches. Alternatively, the user can leave the target field unspecified and internal tape map microcode will make the selection based on a priority scheme.

A change in default control mode will reset all active overlays as well as tape map data. The user may then re-establish any desired overlays. Histogram, servo, and Per-Channel overlays may also be enabled or reset independently. However, any overlay change resets tape map data content, in some approaches.

The host interface Write Tape Map Control command uses specification of an owner since this identifies the internal microcode interface to the tape map. New owner interfaces rely on microcode support, so the host interface Read Tape Map Control command is used to identify which owners are defined for the current configuration.

The collection window dictates the timing at which data will be pulled from the owner subsystem to be logged to the tape map. There are three defined options: every dataset, at wrap/region boundaries, or event driven. This allows for flexible data capture.

Using the default controls, the tape map may be set to one of several default logging modes, as would be understood by one of skill upon reading the present descriptions. These logging modes may be independent of overlays, since a change in logging mode redefines what metrics are collected for a given region. Therefore, metrics may be collected in different manners, or at all, e.g., depending on the different logging modes. One of these basic logging modes is Dataset Logging mode. This mode is different than other logging modes in that each entry or region in the tape map represents one dataset. Other modes accumulate a set of datasets into a logging region defined positionally by wrap and region. A region is, in one embodiment, one of 113 virtual tape sections running lengthwise from beginning of tape to end of tape. Of course, other tape formats may have more or less regions, as would be understood by one of skill in the art. A wrap can be defined as a collection of 113 sections (or regions) on which data is recorded. The cartridge contains a variable number of wraps depending on manufacturer, format, and capacity.

Dataset Logging mode is a detailed tape map view on a dataset by dataset basis. For example, recent tape map buffer sizes allow upwards of 18,000 individual datasets to be stored for analysis, in some embodiments. In this logging mode, the tape map buffer is a wrapping buffer, so most recently processed datasets will appear in the tape map. Other basic logging modes are counter-based, so all datasets for the cartridge mount are represented and buffer-wrap does not apply, according to other embodiments.

Dataset logging mode is useful to assess the affect of optimization activity on read/write quality. According to one embodiment, owner subsystems have access to an internal interface which stops buffer wrap. This trigger is based on owner subsystem criteria (optimization done, threshold, error event, error signature, etc.). The tape map buffer continues to fill, but stops at the wrap point. When formatted, the trigger location is identified to allow the user the opportunity to see before/after changes in read/write quality.

Trap Mode is an optional control unrelated to tape map logging, according to one embodiment. There are defined traps and engineering traps that may be used. A trap is defined as monitoring of a given error, event, and/or criteria by both frequency and location on tape. When in Trap Mode, an informational forced sense command is logged at each wrap/region transition where traps were detected. Request Sense fields are overlaid with further engineering data related to the particular trap. Like the overlays, traps have an owner specified. Since traps do not log to the tape map, enabling or disabling them does not cause tape map data to reset.

According to one embodiment, a system, such as that represented in any of FIGS. 1-3, comprises a tape drive for reading from and/or writing to magnetic tape media, the tape drive having a memory. Now referring to system 400 of FIG. 4, logic for performing logging functions is described according to one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) should be deemed to include any and all possible permutations.

Figure 4:
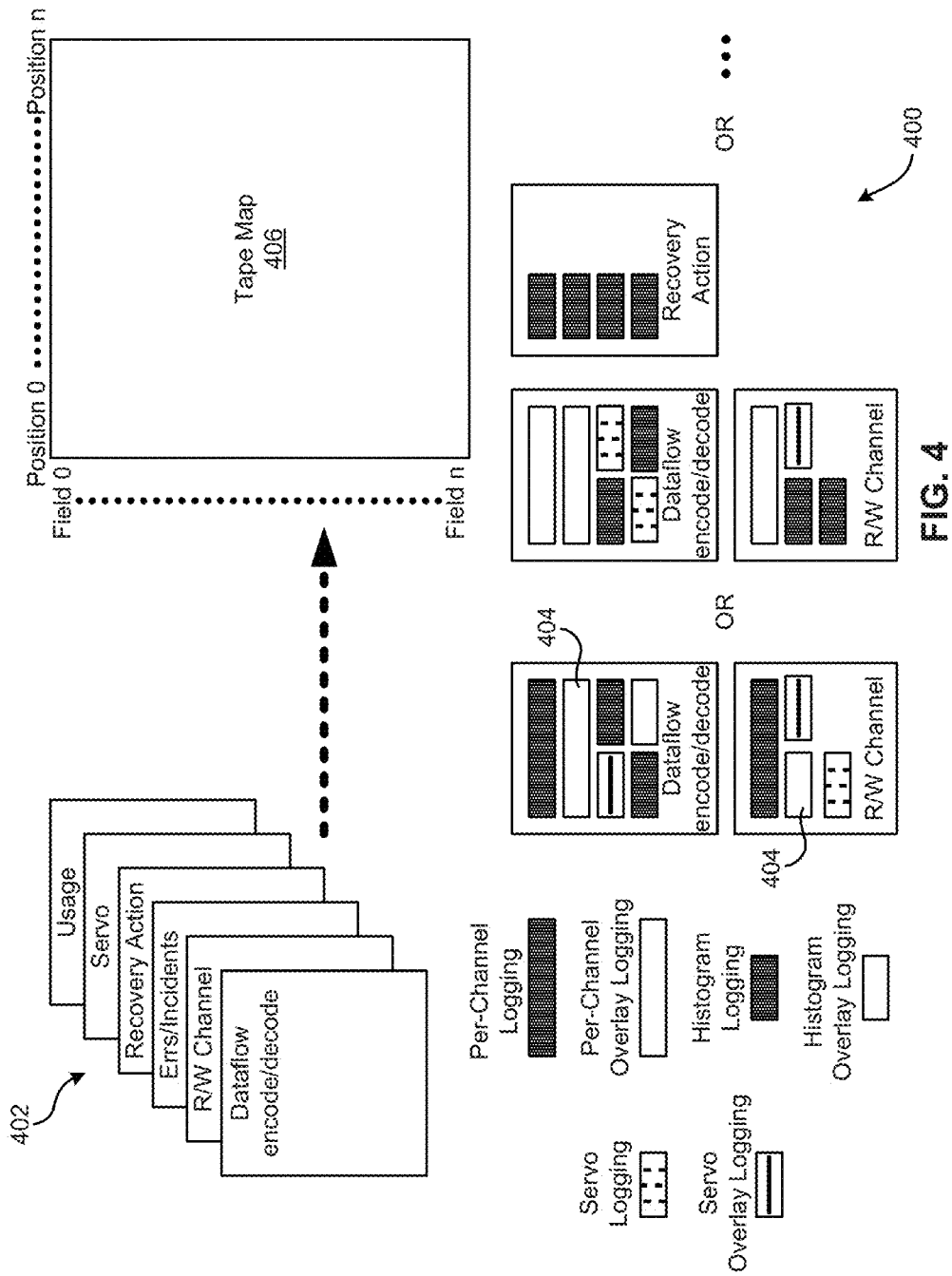
FIG. 4 shows tape map data logging and overlay logging, according to one embodiment.

As shown in FIG. 4, the system 400 comprises logic adapted for monitoring a plurality of parameters relating to operation of the tape drive to collect data from the operation of the tape drive. The parameters 402 may include any information from operation of the tape drive, e.g., encode/decode of the dataflow, recording channel, error recovery algorithms, servo, errors/incidents, usage, etc.

System 400 also includes logic adapted for receiving a specification of one or more user-specified parameters to log during one or more collection windows. The one or more user-specified parameters are specified from the plurality of parameters, e.g., each parameter is monitored, and the user-specified parameters are those which are not recorded in the tape map by default, in one approach. In addition, the system 400 includes logic adapted for logging at least some of the data collected from the operation of the tape drive to the memory during the one or more collection windows, such as in a tape map 406 comprising a plurality of fields, and logic adapted for dynamically overlaying 404 one or more fields from the plurality of fields with data collected from the one or more user-specified parameters. The plurality of fields comprise at least one histogram field, at least one servo field, at least one per-channel field, and at least one per-channel indicator field.

The tape map 406 may include any number of fields, such as 8, 16, 32, 64, 128, 256, etc., and the fields may be of any type, such as histogram fields, servo fields, per-channel fields, and/or per-channel indicator fields, as described previously. Of course, any other type of field may be used, as would be understood by one of skill in the art upon reading the present descriptions. The tape map 406 may also include samples taken from a plurality of different positions, such as tape wraps, between datasets, etc., on a magnetic tape medium, according to one embodiment.

An array of the tape map 406 may have dimensions that are determined, at least in part, using the following equation:

$$\text{tape\_map}*[\text{MAX\_REGIONS}]*[\text{MAX\_WRAPS}]*[\text{MAX\_DIR}] \qquad \text{Equation 1}$$

With reference to Equation 1, the variable MAX_DIR is preferably equal to 2, i.e., corresponding to a forward and a backward direction.

In one embodiment, the tape drive may comprise the memory as a buffer, possibly with a first-in-first-out (FIFO) retention scheme, or any other scheme as would be apparent to one of skill in the art.

In one approach, system 400 may further comprise logic adapted for providing a user with an interface to specify one or more parameters from the plurality of parameters to log in the tape map. This interface may be a graphical user interface (GUI), code line input, or any other input module as would be understood by one of skill in the art.

In another approach, system 400 may further comprise logic adapted for sending the tape map from the memory of the tape drive to another system. In this way, the tape map may be off-loaded from the tape drive periodically or after occurrence of an event, thereby collecting a set of metrics as close to an event of interest as possible.

In one embodiment, system 400 may comprise logic adapted for dynamically altering the one or more collection windows in response to receiving a user-specified collection window for one of the one or more user-specified parameters. The user may specific any event, period, response, etc., in which to base the collection window upon. In another embodiment, the one or more collection windows may be defined by a period between datasets, a period between wrap boundaries, a period between region boundaries, or a period between event occurrences. In a further embodiment, the event may comprise at least one of: a user-specified event, and passage of a predetermined amount of time.

In another embodiment, system 400 may include logic adapted for identifying an owner of an interface from which at least one of the one or more user-specified parameters are sourced. In this way, it can be discovered which owner interface from which to source the one or more user-specified parameters.

In another embodiment, system 400 may further comprise logic adapted for altering a tape map header to reflect the one or more dynamically overlayed fields, and logic adapted for storing the tape map header to the memory. Also, when the owner interface from which the one or more user-specified parameters is identified, this owner interface information may be stored to the tape map header as well.

As described above, various embodiments described and/or suggested herein include one or more slice regions which desirably improve the representation and resolution of regions of interest. In cases of localized aberrations on a given tape, it is useful to be able to slice a default region size into a smaller size in order to better scope the defect using the same tape map structure. It is also generally true that each generation of tape drive supports increasingly longer cartridge lengths and often a larger set of error metrics. Therefore adding scoping ability improves failure analysis and keeps tape map size from growing unnecessarily large in the interest of resolution. Host tape map control commands are available to allow dynamic configuration of a reserved scoping region known as a slice region which, once enabled, may project across all physical wraps. This configuration can be static or dynamic in nature, allowing dynamic microcode control over the triggering of logging to the slice section.

The nature of failure analysis on a flexible media such as tape, is dynamic. Therefore, flexibility in tape map scoping is valuable. In cases where the default length of the tape map region is considered too large to effectively analyze a localized aberration, one logging region in the tape map structure can be made available to "slice" into a smaller size. The size and behavior of this slice region may be determined by a number of different factors which will be described in further detail below.

Figure 5:
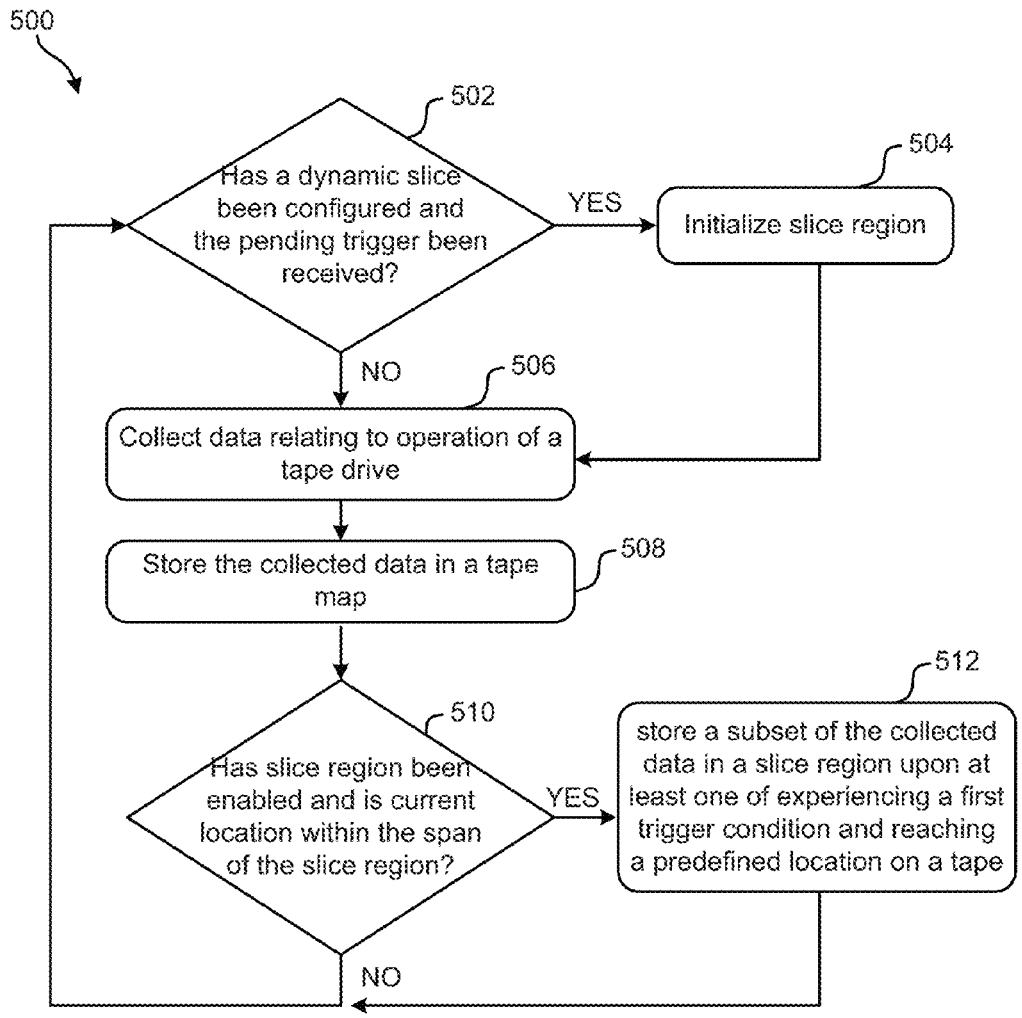
FIG. 5 illustrates a flowchart of a method, according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a central processing unit (CPU) (e.g., see 210 of FIG. 2), a storage system manager (e.g., see 312 of FIG. 3), etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, an application specific integrated circuit (ASIC), a field programmable gate array (FPGA), etc., combinations thereof, or any other suitable computing device known in the art.

According to an exemplary embodiment, any one or more of the operations of method 500 may be performed. As shown in FIG. 5, method 500 includes checking to see if a dynamic slice has been configured and if the pending trigger has been received as seen in decision 502. If so, operation 504 will complete the initialization of the slice region based on pre-configured data such as length from the physical location accompanying the slice trigger. Because an aberration may be unpredictable and not always correspond to a predefined location, the availability of a dynamic slice region allows a user, an administrator, etc. the ability to trigger the allocation of a slice region using microcode control. As a result, if and when an error signature or other pattern recognition occurs, microcode can at that time trigger and enable the slice region location, size and other parameters based on pre-set configuration values received from the Host Write Tape Map Control command. Until the dynamic trigger is received the reserved slice region will remain empty.

Upon performing operation 504 or if it is determined that decision 502 is not satisfied, method 500 further includes collecting data relating to operation of a tape drive as seen in operation 506. e.g., by monitoring a plurality of parameters relating to operation of a tape drive. As previously mentioned, a plurality of parameters relating to operation of a given tape drive may be monitored and/or collected from the operation of the tape drive. Depending on the desired embodiment, the parameters may include any information from and/or relating to operation of the tape drive, e.g., encode/decode of the dataflow, recording channel, error recovery algorithms, servo, errors/incidents, usage, etc. Moreover, the data collected may include one or more of errors, events, statuses, optimization activity, etc., or any other data desired by a user, administrator, operating system, computing device, etc.

Furthermore, operation 508 includes storing the collected data in a tape map. e.g., in the default manner for which the default logging region may be defined by physical location. According to various embodiments, the tape map may include any of those described above, e.g., with reference to 406 of FIG. 4. As will be described in further detail below, it is preferred that the collected data is stored in a plurality of wrap sections or regions of the tape map, each of which may logically correspond to a portion of a wrap. Typically, the wrap sections in the map are specific to a wrap on the tape, but are in no way intended to be limited thereto.

Referring still to method 500 of FIG. 5, decision 510 includes checking to see if a slice region has been enabled and in addition, if the current physical location is within the span of the slice region. If so, operation 512 is performed whereby a subset of the collected data is stored in a slice region upon at least one of experiencing a first trigger condition and reaching a predefined location on a tape. Note that the slice region being of smaller width than a default logging region, will contain only a subset of data normally collected within a default region. However, if decision 510 is not satisfied, method 500 returns to decision 502, e.g., such that the flowchart may be performed again.

As alluded to above, slice regions may be utilized to achieve greater resolution of data stored therein, thereby overcoming the loss or otherwise diminishing of outlying error statistics as seen in conventional products. Furthermore, data collected in operation 506 may be stored primarily into default logging regions and secondarily stored into a reserved slice region having only a subset of data on a smaller scope (or width) and hence a higher resolution of collected data. In the case where more than one slice region is defined, experiencing additional trigger conditions and/or reaching other predefined locations on a tape may create different data subsets.

Furthermore, the slice region may be located in different logical and/or physical locations. In one approach, the slice region, when disabled, may be part of the default tape map. In other words, the slice region may be logically and/or physically stored in the same location as the tape map. Although not shown, method 500 may further include an operation which allocates one wrap section of the tape map as the slice region and reallocates a remainder of the wrap sections of the tape map to correlate to a resized, larger physical length of tape than prior to the reallocation. To better understand this exemplary approach, reference is made to FIGS. 6A-6B which are provided by way of example only, and are in no way intended to limit the invention.

Figure 6A:
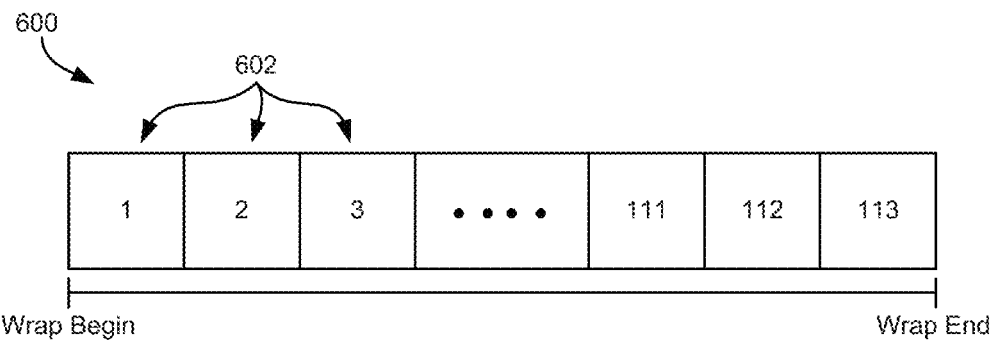
FIGS. 6A-6B illustrate a diagram of a tape wrap according to one embodiment.
Figure 6B:
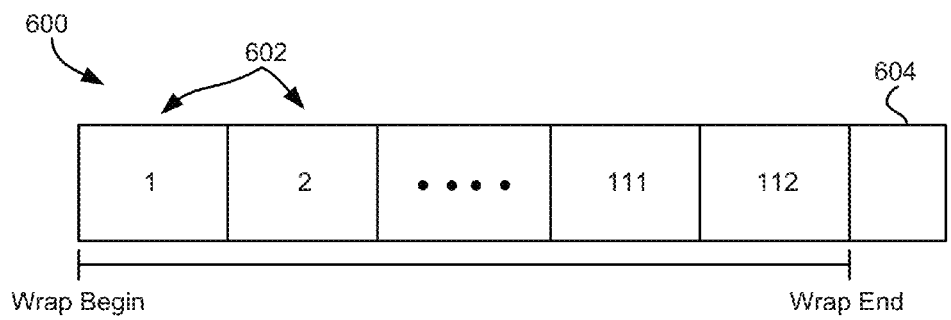

FIGS. 6A-6B depicts a tape wrap 600 of an exemplary data band, in accordance with one embodiment. As an option, the present tape wrap 600 may be implemented in conjunction with features from any other embodiment listed herein, such as those described with reference to the other FIGS., such as FIG. 5. Of course, however, such tape wrap 600 and others presented herein may be used in various applications and/or in permutations which may or may not be specifically described in the illustrative embodiments listed herein. Further, the tape wrap 600 presented herein may be used in any desired environment. Thus FIGS. 6A-6B (and the other FIGS.) should be deemed to include any and all possible permutations.

Looking to FIG. 6A, the tape wrap 600 includes 113 wrap regions 602. It should be noted that although the present tape wrap 600 includes 113 wrap regions 602, other embodiments may include any other desired number of wrap regions, e.g., corresponding to different wrap configurations. Moreover, referring still to FIG. 6A, it is preferred that each of the wrap regions 602 are of the same length, e.g., such that the partitions there between are about evenly spaced.

Nominally, logging to the tape map is done by wrap and equal length wrap regions. For embodiments in which the default length of the tape map region is deemed too large to effectively analyze a localized error statistic (e.g., aberration), a logging region in the tape map structure may be made available as a reserved region which may be sliced into a smaller wrap section, as will soon become apparent. Moreover, the size and/or behavior of this smaller wrap section may be user-specified.

As mentioned above in operations 506 and 508 of FIG. 5, data relating to operation of a tape drive may be collected and stored in a tape map. Although a tape map may be illustrated using a logical representation, e.g., such as the tape map 406 illustrated in FIG. 4, a tape map may physically include data written to a designated tape. Therefore, referring yet again to FIG. 6A, the wrap 600 illustrated therein may represent a portion of a tape map.

According to an exemplary embodiment, once a tape map has had a slice region enabled, the slice region may be enabled as static and/or dynamic. Regardless of whether the slice region is enabled as static and/or dynamic, any tape map data is cleared and the wrap regions 602 may be reallocated and resized into larger sections such that a slice region 604 is introduced to the wrap 600 as seen in FIG. 6B. Because the length of the wrap 600 is fixed, the wrap regions 602 themselves may be reoriented to accommodate the slice region 604, e.g., for scoping. Thus, looking to the present embodiment, one of the wrap regions 602 is used as the slice region 604, thereby reducing the number of equal wrap regions to 112 from the original 113 seen in FIG. 6A. The slice region and the 112 wrap regions now make 113 total regions, which can be stored in the 113 portions of the tape map data structure. If the slice was enabled with a dynamic trigger, then the physical location of the slice remains undetermined until the microcode trigger has been received. Although undetermined, the length and other logging parameters of the slice region may have already been established, e.g., predetermined. Once the trigger is received, the slice region will initialize at the starting physical location and data logging to the slice region will begin.

Moreover, to avoid counter overflow, the size of the slice region 604 is preferably less than the size of a default region, e.g., due to the relatively small amount of data to be stored in the slice region 604. However, according to other embodiments in which there are an exceptional number of error statistics to be stored in the slice region 604, the size of the slice region 604 may be adjusted and/or a second slice region may be allocated in the wrap 600. Further still, subsequent slice regions may be allocated upon experiencing additional trigger conditions and/or reaching different predefined locations on a tape, depending on the desired embodiment. Thus, a given embodiment may include a second, third, fourth, etc. slice region in addition to the slice region 604 shown in FIGS. 6B-6D.

Figure 6C:
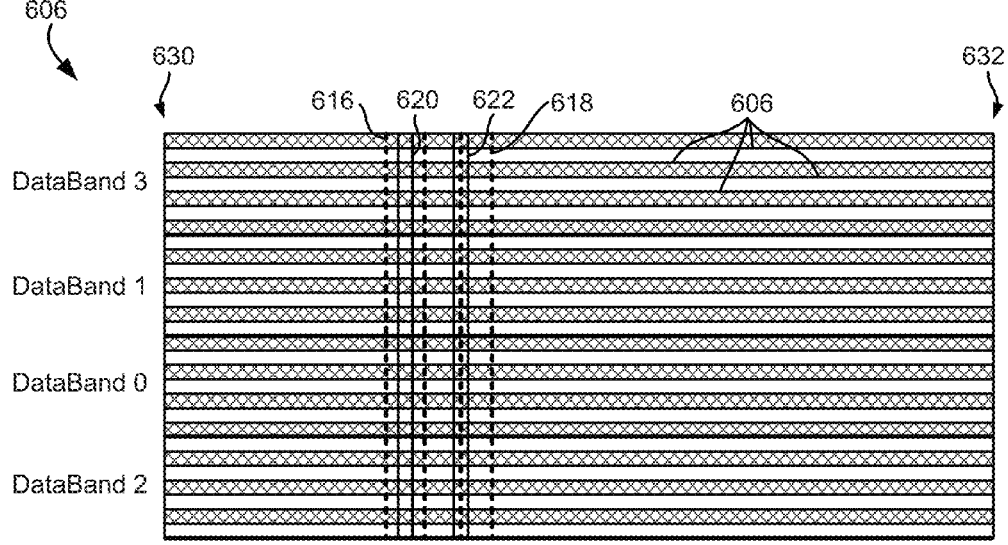
FIG. 6C illustrates a diagram of tape recording layout consisting of 4 data bands indexed by servo control, each data band containing a unique set of wraps which process in serpentine fashion forward (towards end of tape) and backward (towards beginning of tape) according to one embodiment.
Figure 6D:
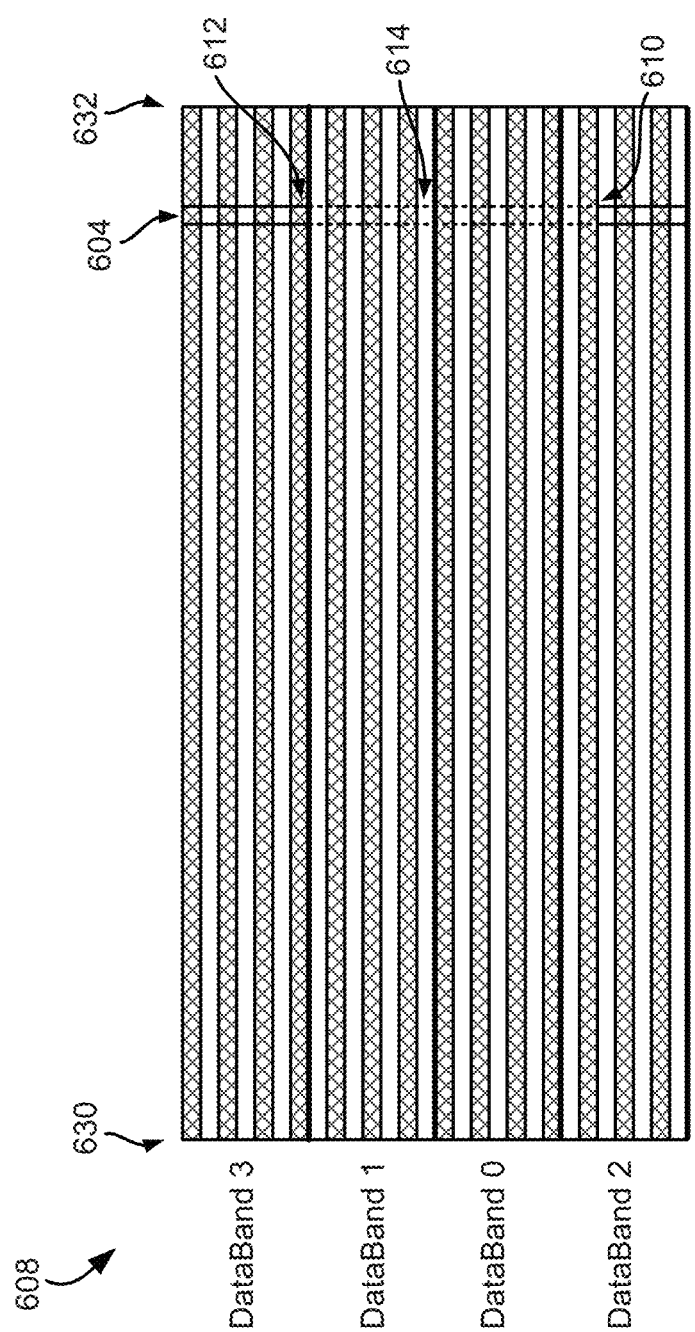
FIG. 6D illustrates a diagram of tape recording layout consisting of 4 data bands indexed by servo control, each data band containing a unique set of wraps which process in serpentine fashion forward (towards end of tape) and backward (towards beginning of tape) a according to one embodiment.

In addition to being present in a given wrap 600 as seen in FIG. 6B, the slice region will extend or project across additional wraps of all data bands as well in accordance with preferred approaches. FIGS. 6C-6D depict data band layouts 606, 608, respectively, in accordance with two embodiments. As an option, either of the present data bands 606, 608 may be implemented in conjunction with features from any other embodiment listed herein, such as those described with reference to the other FIGS., such as FIGS. 6A-6B. Of course, however, such data bands 606, 608 and others presented herein may be used in various applications and/or in permutations which may or may not be specifically described in the illustrative embodiments listed herein. Further, the data bands 606, 608 presented herein may be used in any desired environment. Thus FIGS. 6C-6D (and the other FIGS.) should be deemed to include any and all possible permutations.

FIG. 6C illustrates a series of data bands DataBand 0-3 which may be controlled using servo indexing. Each data band contains a unique set of wraps 600 which process horizontally in a serpentine motion forward (towards end of tape) and backward (towards beginning of tape). The layout and number of wraps 600 assigned to each data band may depend on the desired recording format and/or cartridge type associated therewith.

Referring still to FIG. 6C, two optional placements for a slice region are illustrated. Slice region 620 corresponds to a first placement option, while slice region 622 corresponds to a second placement option. As shown, the two optional placements extend across all wraps of all data bands 606 according to an exemplary embodiment. Moreover, in some approaches, either of the slice regions 620, 622 may extend across all wraps of only selected data bands in a tape. It should also be noted that, although the slice regions 620, 622 are illustrated as being at a particular location along the length of the data band 606, this is in no way intended to limit the present invention, but rather is presented by way of example only. According to other embodiments, one or both of the slice regions 620, 622 may be located at any other location along the data band 606 as desired.

The default logging regions 616, 618 are positioned relative to the two optional placements of slice regions 620, 622. In the first option, the slice region 620 has been defined as a subset of a given default region. However, the second option corresponds to the slice region 622 being defined to span two given default regions, although for a smaller width than those of the first option. It should further be noted that crosshatched wraps were written such that the data processed therein was done in a direction from the beginning of tape 630, towards the end of tape 632. Alternatively, non-hatched wraps were written such that data processed therein was done in a direction from the end of tape 632, towards the beginning of tape 630, i.e., in a direction opposite that of the wraps having the crosshatching.

Alternate to having a slice region extend across all wraps of a given data band, the slice regions 620, 622 may span across all wraps of the tape map after a given wrap and/or between a pair of wraps. Referring now to FIG. 6D, again a data band 608 is illustrated according to an exemplary embodiment which is in no way intended to limit the invention. According to the present embodiment, which is in no way intended to limit the invention, data band 608, the slice region 604 was defined using a dynamic trigger. In this instance, the dynamic trigger was not experienced until reaching a wrap 610 in DataBand 2 as a result of which, the slice region 604 is initialized and extends across all wraps 600 from a starting wrap 610 to an end wrap 612 between a pair of longitudinal position (LPOS) markers for each wrap (not shown). Although the slice region by definition spans all wraps, due to the late trigger the wraps of DataBand 0, DataBand 1 and a subset of DataBand 2 will remain empty as denoted by empty logging 614. In other words, the section of slice region 604 denoted by the dashed lines has no data stored therein. Moreover, depending on the desired embodiment, starting wrap 610 and/or end wrap 612 may be positioned at any location in the data band 606, or any other data band of a tape. It is also preferred that the wrap direction for the slice region 604 is established, such that the slice region 604 extends from a LPOS value towards the intended direction of a given wrap, e.g., from a start LPOS towards an end LPOS.

Although a slice region may be stored exclusively in the tape map according to some approaches, in other approaches a slice region may additionally or alternatively be stored in a separate location than that of the tape map location. For example, the tape map may store all collected data relating to operation of a tape drive (e.g., including a subset of that collected data), while a slice region which may or may not be a part of the tape map, may store a redundant copy of the subset of the collected data. Thus, in addition to providing a higher resolution copy of the data corresponding to the subset of the collected data, a backup copy of the data may be available in the tape map, e.g., for recovery purposes in the case of data loss. Thus, depending on the desired embodiment, the slice region may be part of the tape map, a separate data collection, etc.

When the tape map is formatted for viewing, the slice region will preferably appear distinct from other regions of the tape map, and will have a finer resolution as described above.

While any known technique may be used to configure tape map slice regions, in preferred embodiments, tape map slice regions and/or parameters thereof may be configured and/or reset using host interface commands (also referred to herein as host commands) such as Write Tape Map Control and Read Tape Map Control. As would be appreciated by one skilled in the art upon reading the present description, these host commands may include engineering-use commands which are capable of forming the tape map and/or performing extended diagnostic control. Moreover, a range of identifiers may be modified using the Write Tape map Control command. Moreover, by implementing different parameter values, the Write Tape Map Control command may implement different tape map slice control options.

According to an exemplary embodiment, which is in no way intended to limit the invention, the Write Tape Map Control command may implement three parameters and two return codes by 11 byte counts (BC) of tape map slice control, having illustrative slice control options as follows.

BC 0 SLICE—IDENTIFIER PARM.

| | |
|---|---|
| 01h | Trigger Method |
| 02h | Sizing Method |
| 03h | Region Size |
| 04h | START LPOS (beginning of slice region) |
| 05h | END LPOS (end of slice region) |
| others | Reserved. |

BC 1 SLICE—QUALIFIER PARM.

| Value | Description |
|---|---|
| 00h | Tape Map Slice disabled (restore to default logging) |
| 01h | Tape Map Slice enabled |
| others | Any undefined value will be ignored |

BC 2 SLICE—MODE PARM. Specifies the processing mode for which slice region logging applies.

| Value | Description |
|---|---|
| 00h | Both read and write mode (default) |
| 01h | Read mode only |
| 02h | Write mode only |
| others | Reserved |

BC 3-6 SLICE—PARM VALUE: Specifies the value for specified slice identifier parm

| Identifier Value | | Description |
|---|---|---|
| 01h | | Trigger Method options: disabled, static, dynamic |
| | 00h | Disabled trigger (default) |
| | 01h | Static trigger |
| | 02h | Dynamic trigger |
| | Others | Other values are undefined, and will force default value |
| 02h | | Sizing Method options: percentage, mm length, lpos length, fixed length |
| | 00h | Percentage of nominal LPOS region width (default) |
| | 01h | Length in mm |
| | 02h | Length in LPOS units |
| | 03h | Fixed length (SLPOS/ELPOS) |
| | Others | Other values are undefined, and will force default value |
| 03h | | nnnnnnnh Region Size, units of width are determined by PARM 02 value. Any specified width greater than default region width will disable slice region logging. |

-continued

| Identifier Value | Description |
| --- | --- |
| 04h | nnnnnnnnh Start LPOS (derived or fixed depending on Trigger Method) |
| 05h | nnnnnnnnh End LPOS (derived of fixed depending on Trigger Method) |

BC 7-8 SLICE—SPECIFIC ERROR RETURN CODE.
BC 9-10 SLICE—PROBLEM PARM

It should be noted that "nnnnnnnnh" is intended to indicate that is that there are a range of values (e.g., which are yet to be determined) which indicate which configuration option is chosen for a given identifier. For example, in the context of a Write Tape Map Control Command, if identifier 01 h appears in BC 0, the user may desire to change the Trigger Method. As a result, the trigger method may be disabled, declared static, or declared dynamic, e.g., determined by a unique value which has been represented by nnnnnnnh.

As shown, BC 0 corresponds to a slice identifier parm having an exemplary list of identifiers itemized using different hex counts. Moreover, BC 3-6 represents the value which is to be assigned to each identifier. For example, which is in no way intended to limit the invention, if a Write Tape Map Control command is received and BC 0 has a 01 h identifier value, this corresponds to a request to access the slice trigger method, which corresponds to a value presented in BC 3-6. It should also be noted that the Start LPOS identifier value 04h will be ignored by Write Tape Map Control command when dynamic trigger is enabled. The Read Tape Map Control Command will populate this field with value being used by slice region. Similarly, Stop LPOS identifier value 05h will be ignored by Write Tape Map Control command when dynamic trigger is enabled, or when fixed length not specified. Moreover, the Read Tape Map Control Command will populate this field with value being used by slice region.

Values of 04h and 05h represent the beginning and end of a slice region corresponding to LPOS values as previously mentioned, e.g., referring momentarily back to FIG. 6D. If a dynamic trigger is established, then initializing one or more LPOS values may be deferred until the trigger is received (e.g., reached). Finally, any other undefined or invalid hex values associated with BC 0 may be reserved, e.g., to cause the default setting of 00h to be applied.

Moreover, as described above, the 01h Trigger Method may be disabled or changed to a static trigger, a dynamic trigger, etc. The 02h value denotes the method by which a slice is measured, e.g., based on a percentage, length (e.g., mm), LPOS length, fixed, etc., depending on the desired embodiment. Furthermore, the 03h Region size is interpreted based on the 02h Sizing Method value.

BC 1 corresponds to specifying how the reserved tape map region is to be configured. For example, count 00h disables a tape slice, while count 01 h enables a tape slice. Furthermore, BC 2 specifies the processing mode for which slice region logging applies. In other words, BC 2 enables a user the ability to restrict a given embodiment to only being able to read (01h) or write (02h).

Referring now to BC 7-8, the specific return code may be provided in response to a Read Tape Map Control command. It preferably provides information as to which BC corresponds to a problem that has occurred during processing of the Write Tape Map Control command. For example, a tape map may return an error report to a user indicating that an error condition has occurred while managing changes to the identifier parm of BC 0. Moreover, the return code of BC 9-10 may also only be provided in response to a Read Tape map Control command in some approaches. Moreover, in other approaches, BC 9-10 may identify the parm for which changes cannot be made. These return codes preferably remain until the next Write Tape Map control command is received.

Furthermore, the tape map slice region configuration presented above may be implemented in hardware, in memory, by a controller, etc. For example, although the BCs are shown as being implemented using host commands in the above example, in other embodiments serial ports may be used to send commands without being connected to a host. However, according to other embodiments, different tape maps may include different configurations, e.g., depending on the desired embodiment as would be appreciated by one of skill in the art upon reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program: etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A controller-implemented method, comprising:
    collecting data relating to operation of a tape drive;
    storing the collected data in wrap sections of a tape map, wherein the wrap sections of the tape map correlate to physical lengths of tape;
    storing a subset of the collected data in a slice region upon at least one of experiencing a first trigger condition and reaching a predefined location on a tape, wherein the slice region is part of the tape map; and
    allocating one wrap section of the tape map as the slice region and reallocating a remainder of the wrap sections of the tape map to correlate to a larger physical length of tape than prior to the reallocation.

2. The method of claim 1, wherein a first copy of the subset of the collected data is stored in at least one wrap section of the tape map and a second copy of the subset of the collected data is stored in the slice region.

3. The method of claim 1, wherein the collected data includes at least one of: errors, events, statuses and optimization activity.

4. The method of claim 1, wherein the slice region spans across all wraps of the tape map between a pair of linear position values.

5. The method of claim 4, wherein the pair of linear position values has deferred assignment pending receipt of additional trigger conditions.

6. The method of claim 1, wherein a size of the slice region is less than a size of a default region.

7. The method of claim 1, wherein storing subsequent subsets of the data collected is deferred pending receipt of additional trigger conditions.

8. The method of claim 1, comprising using a host interface command to configure or reset slice region parameters.

9. A system, comprising:
a processor and logic integrated with and/or executable by the processor, the logic being configured to:
collect data relating to operation of a tape drive;
store the collected data in a tape map;
store a subset of the collected data in a slice region upon at least one of experiencing a first trigger condition and reaching a predefined location on a tape wherein the slice region is part of the tape map; and
allocate one wrap section of the tape map as the slice region and reallocate a remainder of the wrap sections of the tape map to correlate to a larger physical length of tape than prior to the reallocation.

10. The system of claim 9, wherein a first copy of the subset of the collected data is stored in at least one wrap section of the tape map and a second copy of the subset of the collected data is stored in the slice region.

11. The system of claim 9, wherein the collected data includes at least one of: errors, events, statuses and optimization activity.

12. The system of claim 9, wherein the slice region spans across all wraps of the tape map.

13. The system of claim 9, wherein the slice region spans across all wraps of the tape map between a pair of linear position values.

14. The system of claim 9, wherein a size of the slice region is less than a size of a default region and can be positioned across or between default region boundaries.

15. The system of claim 9, wherein storing subsequent subsets of the data collected upon experiencing additional trigger conditions.

16. A computer program product for storing data relating to operation of a tape drive, the computer program product comprising a computer readable storage medium having program instructions embodied therewith, the program instructions executable by a controller to cause the controller to:
collect, by the controller, data relating to operation of a tape drive;
store, by the controller, the collected data in a tape map; and
store, by the controller, a subset of the collected data in a slice region upon at least one of experiencing a first trigger condition and reaching a predefined location on a tape, wherein the slice region is part of the tape map; and
allocate, by the controller, one wrap section of the tape map as the slice region and reallocate a remainder of the wrap sections of the tape map to correlate to a different physical length of tape than prior to the reallocation.

17. The computer program product of claim 16, wherein a first copy of the subset of the collected data is stored in at least one wrap section of the tape map and a second copy of the subset of the collected data is stored in the slice region.

18. The computer program product of claim 16, wherein the program instructions are executable by the controller to cause the controller to reallocate the remainder of the wrap sections of the tape map to correlate to a larger physical length of tape than prior to the reallocation.

* * * * *